United States Patent
Hancock, Sr.

(10) Patent No.: US 9,038,753 B2
(45) Date of Patent: *May 26, 2015

(54) VEHICLE HYDRAULIC SYSTEM

(71) Applicant: Leonard H. Hancock, Sr., Hummelstown, PA (US)

(72) Inventor: Leonard H. Hancock, Sr., Hummelstown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,030

(22) Filed: Oct. 16, 2013

(65) Prior Publication Data

US 2014/0102815 A1    Apr. 17, 2014

Related U.S. Application Data

(63) Continuation-in-part of application No. 12/110,749, filed on Apr. 28, 2008, now Pat. No. 8,567,538.

(60) Provisional application No. 60/926,576, filed on Apr. 27, 2007.

(51) Int. Cl.
| | |
|---|---|
| *B60K 17/28* | (2006.01) |
| *B60K 25/02* | (2006.01) |
| *B60K 25/00* | (2006.01) |
| *B60K 17/22* | (2006.01) |

(52) U.S. Cl.
CPC ................. *B60K 25/02* (2013.01); *B60K 17/22* (2013.01); *B60K 17/28* (2013.01); *B60K 25/00* (2013.01); *B60Y 2200/14* (2013.01)

(58) Field of Classification Search
USPC ........ 180/53.1, 53.4, 53.6, 53.61, 53.62, 53.7
See application file for complete search history.

(56) References Cited

U.S. PATENT DOCUMENTS

| | | | |
|---|---|---|---|
| 4,535,859 A | 8/1985 | van der Lely | |
| 4,618,016 A | 10/1986 | van der Lely | |
| 4,899,525 A | 2/1990 | Takei et al. | |
| 6,237,708 B1 | 5/2001 | Kawada | |
| 6,722,464 B2 | 4/2004 | Nakatani et al. | |
| 6,902,017 B2 | 6/2005 | Ohashi | |
| 6,964,310 B2 | 11/2005 | Hasegawa | |
| 7,077,222 B2 * | 7/2006 | Ohashi | 180/53.6 |
| 7,370,714 B2 * | 5/2008 | Yasuda et al. | 180/53.4 |
| 7,617,892 B2 * | 11/2009 | Nishimoto et al. | 180/53.4 |
| 7,689,332 B2 * | 3/2010 | Yakes et al. | 701/22 |
| 7,690,451 B2 * | 4/2010 | Chiao | 180/53.5 |
| 7,775,309 B2 * | 8/2010 | Ohashi et al. | 180/53.4 |
| 7,841,430 B2 | 11/2010 | Shiba | |
| 7,980,339 B2 * | 7/2011 | Ishii et al. | 180/53.4 |
| 8,096,571 B1 * | 1/2012 | Noe | 280/492 |
| 8,127,872 B2 | 3/2012 | Inamori et al. | |
| 8,567,538 B2 * | 10/2013 | Hancock, Sr. | 180/53.1 |
| 2002/0109583 A1 | 8/2002 | Losey | |
| 2003/0231131 A1 | 12/2003 | Dimig et al. | |
| 2004/0222899 A1 | 11/2004 | Yezersky et al. | |
| 2004/0262054 A1 * | 12/2004 | Ishimaru et al. | 180/53.4 |
| 2005/0102069 A1 | 5/2005 | Mueller | |
| 2007/0017729 A1 * | 1/2007 | Nishimoto et al. | 180/374 |
| 2007/0163817 A1 * | 7/2007 | Ohashi et al. | 180/53.4 |

* cited by examiner

*Primary Examiner* — Toan To
(74) *Attorney, Agent, or Firm* — The Webb Law Firm

(57) ABSTRACT

A hydraulic system includes a power assembly connected to a vehicle drive line. The power assembly is selected from the group consisting of a split shaft power take off assembly and a transfer case. At least one hydraulic pump is connected to the power assembly. At least one hydraulic consumer is drivingly connected to the at least one hydraulic pump. The at least one hydraulic pump is selected from the group consisting of a variable displacement pump and a constant displacement pump.

16 Claims, 5 Drawing Sheets

US 9,038,753 B2

VEHICLE HYDRAULIC SYSTEM

CROSS REFERENCE TO RELATED APPLICATIONS

This application is a continuation-in-part of U.S. application Ser. No. 12/110,749 filed Apr. 28, 2008 (now U.S. Pat. No. 8,567,538), which claimed the benefits of U.S. Provisional Application No. 60/926,576 filed Apr. 27, 2007, and is also related to U.S. patent application Ser. No. 12/106,568, all of which applications are herein incorporated by reference in their entirety.

BACKGROUND OF THE INVENTION

1. Field of the Invention

This invention relates generally to vehicle hydraulic systems and is particularly useful for emergency and rescue vehicles.

2. Technical Considerations

Some vehicles, such as but not limited to fire or rescue vehicles, have hydraulic systems configured to drive various hydraulic powered components and emergency equipment, such as pumps, generators, valves, motors, hydraulic tools, etc. The hydraulic pumps supplying hydraulic fluid from a reservoir to these hydraulic driven components are typically powered off of the vehicle transmission.

It would be desirable to provide a hydraulic system that maximizes the efficiency of the vehicle. That is, a hydraulic system configured to drive or provide hydraulic power to a number of different types of tools or components.

SUMMARY OF THE INVENTION

A hydraulic system comprises a power assembly connected to a vehicle drive line. The power assembly is selected from the group consisting of a split shaft power take off assembly and a transfer case. At least one hydraulic pump is connected to the power assembly. At least one hydraulic consumer is operatively connected to the at least one hydraulic pump. The at least one hydraulic pump is selected from the group consisting of a variable displacement pump and a constant displacement pump.

Another hydraulic system comprises a power assembly connected to a vehicle drive line. The power assembly is selected from the group consisting of a split shaft power take off assembly and a transfer case. A first variable displacement pump is connected to the power assembly. A second pump is connected to the first variable displacement pump. The second pump is selected from the group consisting of a variable displacement pump and a constant displacement pump. A fire pump is connected to the first variable displacement pump or the second pump.

A method of operating a fire pump comprises operatively connecting a first pump, such as a first variable displacement pump, to a power assembly connected to a vehicle drive line. The power assembly is selected from the group consisting of a split shaft power take off assembly and a transfer case. A second pump, such as a second variable displacement pump, is operatively connected to the first pump, e.g., first variable displacement pump. A fire pump is operatively connected to the first or second pumps, e.g., first or second variable displacement pumps.

BRIEF DESCRIPTION OF THE DRAWINGS

Additional advantages and details are explained in greater detail below with reference to the exemplary embodiments illustrated in the accompanying drawing figures in which like reference numbers identify like parts throughout.

DESCRIPTION OF THE PREFERRED EMBODIMENTS

Figure 1:
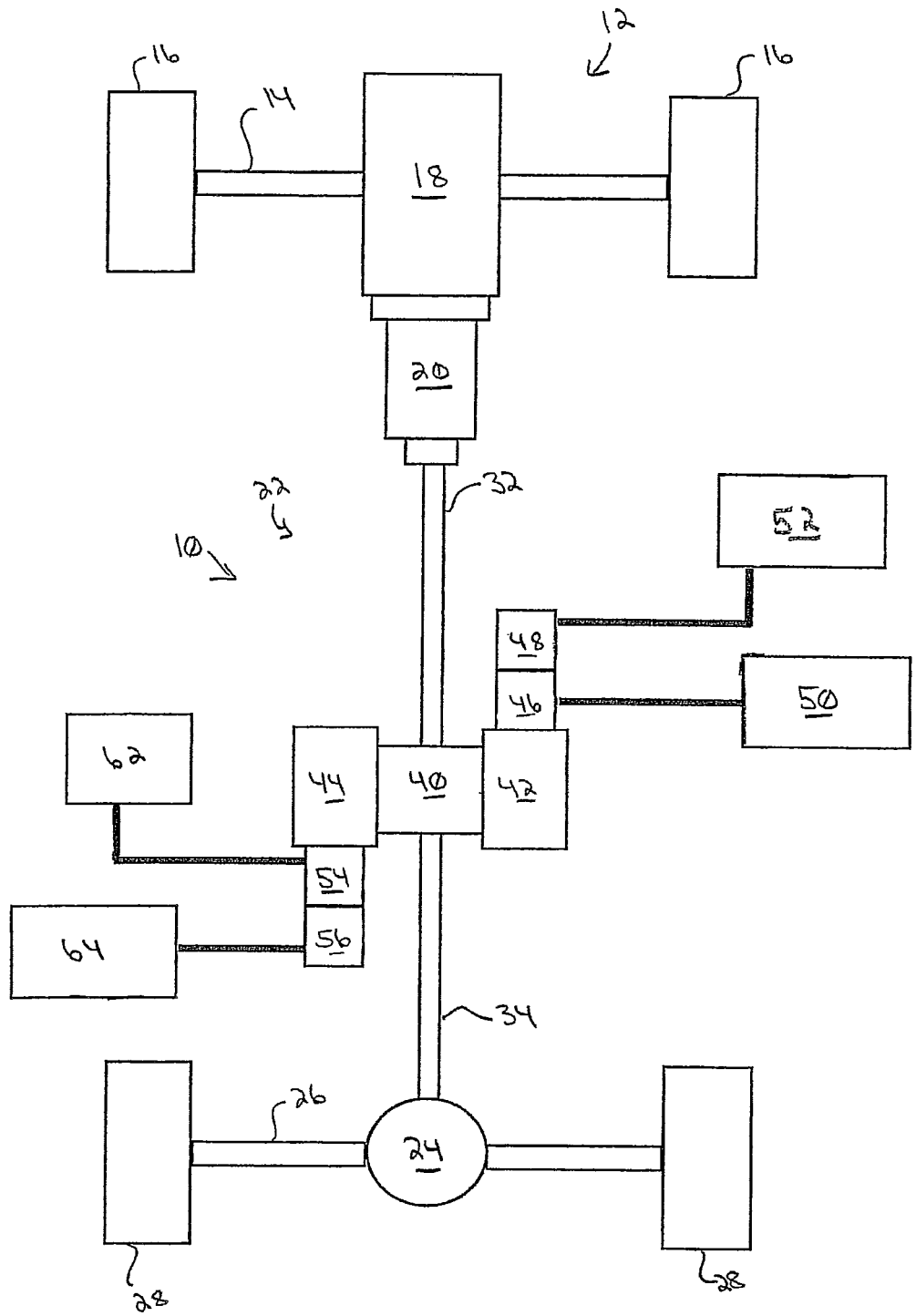
FIG. 1 is a schematic view of a vehicle incorporating a hydraulic system of the invention.

As used herein, spatial or direction terms, such as "up", "down", "above", "below", "left", "right", and the like, relate to the invention as it is shown in the drawing figures. However, it is to be understood that the invention can assume various alternative orientations and, accordingly, such terms are not to be considered as limiting.

An exemplary hydraulic system 10 of the invention incorporated into a vehicle chassis 12 is illustrated in FIG. 1. The components of a typical vehicle chassis 12 will be well understood by one of ordinary skill in the art and, therefore, will not be described in great detail. The vehicle chassis 12 includes a front axle 14 having front wheels 16 attached at the ends of the front axle 14. The chassis 12 supports an engine 18 having a transmission 20. A drive line 22 extends from the transmission 20 to a rear differential 24 connected to a rear axle 26. Rear wheels 28 are connected to the ends of the rear axle 26. In the embodiment shown in FIG. 1, the drive line 22 is divided into a forward drive line 32 and a rear drive line 34.

Examples of vehicles suitable for the invention include, but are not limited to, Class III, IV or V trucks (as designated by the National Truck Equipment Association). One suitable vehicle is a Ford F-550 truck.

A power assembly, such as a split shaft power take off assembly or a transfer case, is connected to the vehicle, such as to the vehicle drive line, the vehicle transmission, or the crank shaft of the engine. In the embodiment shown in FIG. 1, the power assembly is illustrated as a split shaft power take off assembly 40 and is connected to the forward and rear drive lines 32, 34. The split shaft power take off assembly 40 allows the hydraulic system to be operated by the vehicle drive train without the vehicle wheels moving. At least one power take off is connected to the split shaft power take off assembly 40. In the illustrated embodiment, a first power take off 42 and a second power take off 44 are connected to the split shaft power take off assembly 40. In the illustrated embodiment, the first power take off 42 drives a first hydraulic pump 46 and a second hydraulic pump 48. The hydraulic pumps 46, 48 can be variable displacement pumps (e.g., swash plate piston pumps) or constant displacement pumps (e.g., piston pumps or gear pumps). The first hydraulic pump 46 supplies hydraulic fluid from a reservoir to one or more first users 50 and the second hydraulic pump 48 provides hydraulic fluid from a reservoir to one or more second users 52. The hydraulic pumps 46, 48 can be driven by a common drive shaft or the drive shafts of the pumps can be connected.

As also shown in FIG. 1, the second power take off 44 powers a third hydraulic pump 54 and a fourth hydraulic pump 56. The hydraulic pumps 54, 56 can be driven by a common drive shaft or the drive shafts of the pumps can be connected. The third and fourth hydraulic pumps 54, 56 can also be connected to third and fourth hydraulic users 62, 64, respectively. Non-limiting examples of hydraulic users 50, 52, 62, 64 include, but are not limited to, hydraulic tools utilizing high or low pressure, fire pumps, hydraulic motors, and hydraulic generators to provide electricity to various users. The hydraulic pumps 46, 48, 54, 56 can be connected in series or in parallel.

Figure 2:
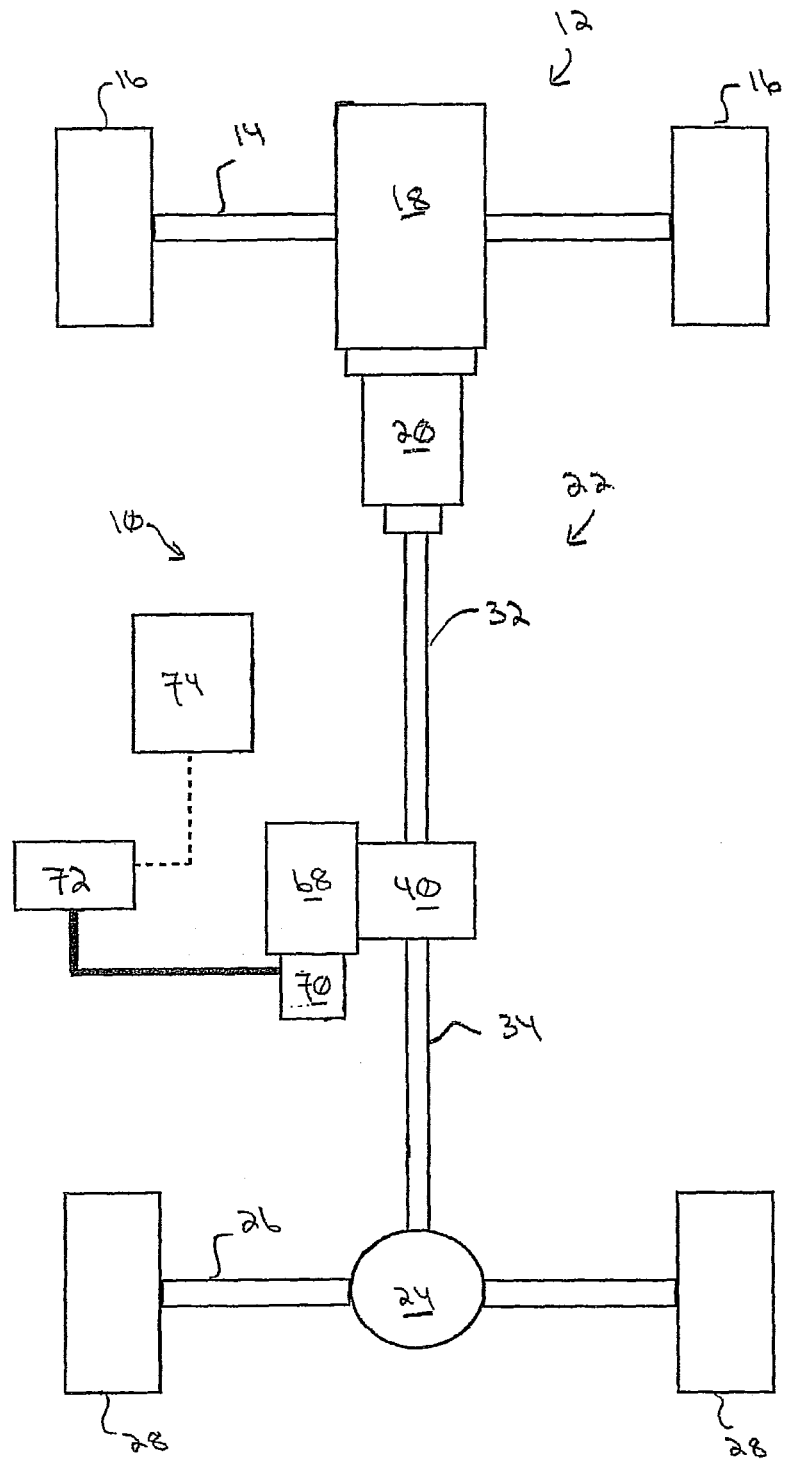
FIG. 2 is a schematic view of another vehicle incorporating a hydraulic system of the invention.

FIG. 2 shows another embodiment of a hydraulic system 10 of the invention in which the split shaft power take off assembly 40 drives a power take off 68. A hydraulic pump 70 is connected to the power take off 68. The hydraulic pump 70 supplies hydraulic fluid to run or power a fire pump 72 and, optionally, one or more other hydraulic components 74, such as but not limited to a salt spreader control valve.

Figure 3:
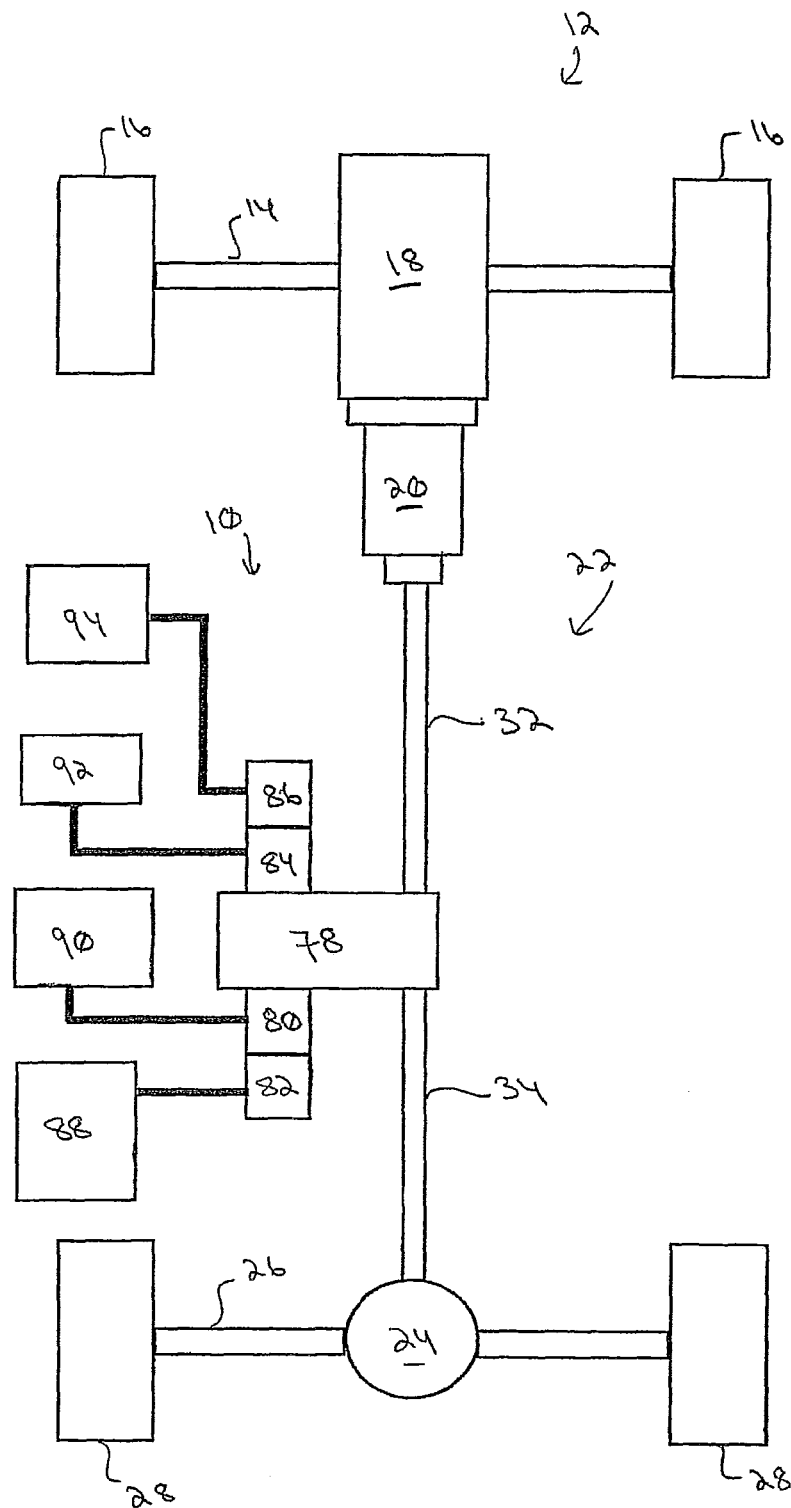
FIG. 3 is a plan view of a further embodiment of a vehicle hydraulic system incorporating features of the invention.

FIG. 3 shows a further embodiment of a vehicle hydraulic system 10 of the invention. However, in this embodiment, a transfer case 78 is used rather than a split shaft power take off assembly 40. The transfer case 78, which is in addition to the vehicle transfer case, can be directly mounted to the vehicle transmission 20 or, as shown in FIG. 3, can obtain power from rotation of the vehicle drive shaft. For example, the transfer case 78 can be connected to the forward and rear drive lines 32, 34 and powered thereby. A plurality of hydraulic pumps are connected to the transfer case 78. In the illustrated embodiment, a first hydraulic pump 80 and a second hydraulic pump 82 are connected to one side of the transfer case 78, and a third hydraulic pump 84 and a fourth hydraulic pump 86 are connected to another side of the transfer case 78. The hydraulic pumps 80, 82, 84, 86 can provide hydraulic fluid from a reservoir to various hydraulic users 88, 90, 92, 94, such as but not limited to hydraulic tools, fire pumps, generators, and salt spreader control valves, just to name a few. The adjacent hydraulic pumps can be driven by a common drive shaft or the drive shafts of the pumps can be connected.

Figure 4:
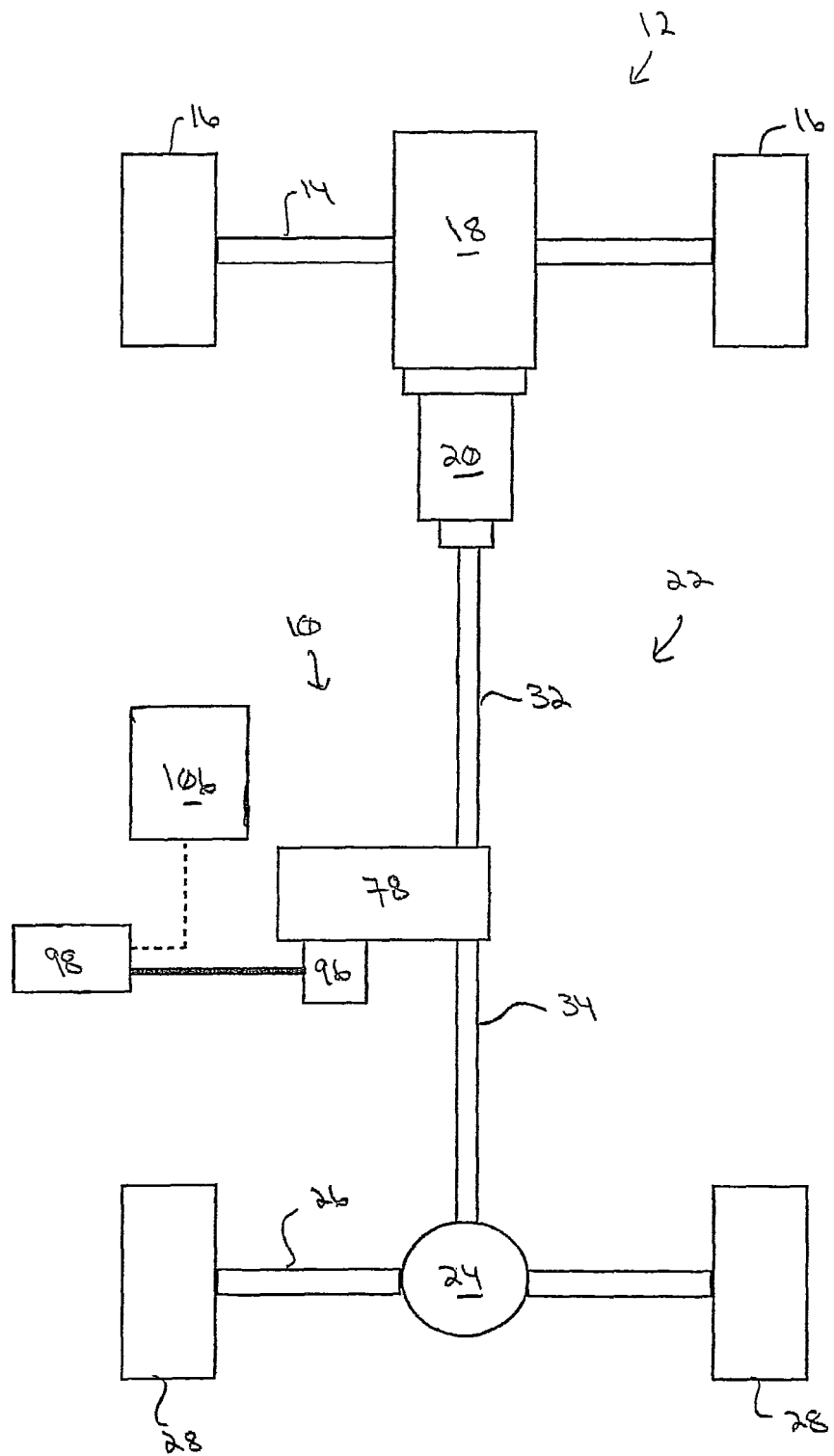
FIG. 4 is a schematic view of an additional vehicle hydraulic system incorporating features of the invention.

FIG. 4 shows another hydraulic system 10 of the invention in which the transfer case 78 powers a hydraulic pump 96 which supplies hydraulic fluid to power a fire pump 98 and, optionally, one or more additional hydraulic users 106, such as but not limited to a salt spreader control valve.

Figure 5:
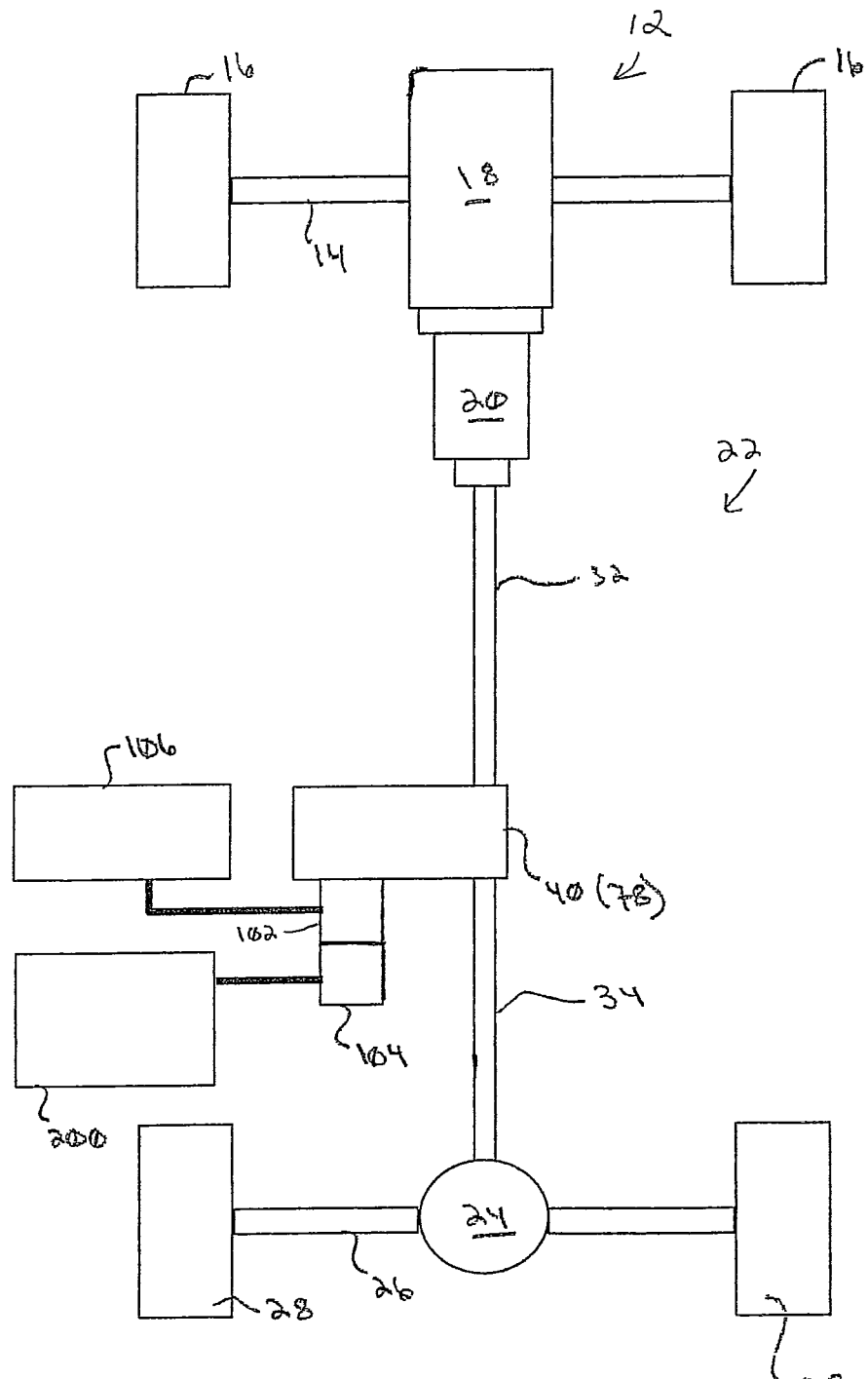
FIG. 5 is a schematic view of a vehicle hydraulic system of the invention driving a fire pump.

FIG. 5 is a further embodiment of a hydraulic system 10 of the invention in which a power assembly, such as a split shaft power take off assembly 40 or a transfer case 78, is connected to the vehicle, such as to the drive train as discussed above. In this embodiment, a first hydraulic pump 102 and a second hydraulic pump 104 are connected in series. The hydraulic pumps 102, 104 can be individually selected from constant displacement pumps or variable displacement pumps. In one non-limiting embodiment, the first hydraulic pump 102 is a first variable displacement pump 102 and is connected to a second variable displacement pump 104 in series. For example, the first and second pumps 102, 104 can share a common drive shaft or the drive shafts of the individual pumps 102, 104 can be connected together. A hydraulic user, such as a fire pump, can be operatively connected to the first and/or second pumps 102, 104. For example, the first variable displacement pump 102 can be used to power a hydraulic user, such as a fire pump 106 (for example, by driving a hydraulic motor that drives the fire pump 106). The second variable displacement pump 104 can be used to power a hydraulic user 200, such as a fire pump, salt spreader, or other hydraulic user.

In another non-limiting embodiment, the second pump 104 is a constant displacement pump. In this embodiment, the speed of the engine 18 can be maintained at a constant setting and the first variable displacement pump 102 can be varied to change the displacement (i.e., speed up or slow down) to drive the fire pump 106 while the constant displacement pump 104 maintains its output. That is, since the drive shafts of the first hydraulic pump (e.g., first variable displacement pump 102) and second hydraulic pump (e.g., second constant displacement pump 104) are connected, changing the displacement of the variable displacement pump 102 does not affect the output of the constant displacement pump 104. The variable displacement pump 102 can be electronically controlled to maintain the fire pump 106 at a predetermined output pressure. The vehicle engine 18 can be set and maintained at a specific RPM at which the engine will produce a desired torque and power (for example maximum torque rise and/or maximum power output). Since the system can be designed to operate at optimal torque and horsepower, the hydraulic system 10 of the invention can provide faster system response times, while flow and pressure outputs are also optimized, allowing a broader range of operating flows and pressures. Additionally, in the hydraulic system 10, high pressure hydraulic circuitry can be driven from the drive shaft (e.g. split shaft power take off assembly 40) not drawn from a vehicle transmission-mounted power take off, as was previously done. Additionally, the hydraulic system 10 has the advantage that the hydraulic system 10 can be operated while the vehicle is moving or stationary. In an additional embodiment, when a transfer case 78 is used, the associated hydraulic pumps can be attached directly to the transfer case 78 or can be connected by a driveshaft and/or coupling. While in the above embodiment, the variable displacement pump 102 was connected to the power take off 40 and the constant displacement pump 104 was connected to the variable displacement pump 102, it is to be understood that the pumps could be connected in any order. In one non-limiting configuration, the first variable displacement pump 102 is connected to the power assembly and the second pump 104 is a second variable displacement pump connected to the first variable displacement pump 102. A hydraulic user, such as a fire pump 106, can be operatively connected with the first or second variable displacement pumps 102, 104.

It will be readily appreciated by those skilled in the art that modifications may be made to the invention without departing from the concepts disclosed in the foregoing description. For example, it is to be understood that any combination of variable displacement and constant displacement pumps could be used in a variety of configurations. Accordingly, the particular embodiments described in detail herein are illustrative only and are not limiting to the scope of the invention, which is to be given the full breadth of the appended claims and any and all equivalents thereof.

The invention claimed is:

1. A vehicle hydraulic system, comprising:
a power assembly connected to a vehicle drive line, the power assembly selected from the group consisting of a split shaft power take off assembly and a transfer case;
at least one hydraulic pump connected to the power assembly; and
at least one hydraulic consumer operatively connected to the at least one hydraulic pump,
wherein the at least one hydraulic pump is selected from the group consisting of a variable displacement pump and a constant displacement pump.

2. The hydraulic system according to claim 1, wherein the power assembly comprises a split shaft power take off assembly, wherein at least one power take off is connected to the split shaft power take off assembly, and wherein the at least one hydraulic pump is connected to the at least one power take off for driving the at least one hydraulic consumer.

3. The hydraulic system according to claim 2, including a first power take off and a second power take off connected to the split shaft power take off assembly, and at least one hydraulic pump connected to each power take off for driving at least one hydraulic consumer.

4. The hydraulic system according to claim 3, wherein the first power take off drives first and second hydraulic pumps.

5. The hydraulic system according to claim 3, wherein the second power take off drives third and fourth hydraulic pumps.

6. The hydraulic system according to claim 1, comprising at least one set of hydraulic pumps connected in series.

7. The hydraulic system according to claim 2, wherein the power take off drives a variable displacement pump and the variable displacement pump drives a constant displacement pump.

8. The hydraulic system according to claim 1, wherein the hydraulic consumers include a fire pump.

9. The hydraulic system according to claim 8, wherein the hydraulic pump is a variable displacement pump.

10. The hydraulic system according to claim 1, wherein the power assembly comprises a transfer case driven by a vehicle drive line, wherein the at least one hydraulic pump is driven by the transfer case, and wherein the at least one hydraulic consumer is driven by the hydraulic pump.

11. The hydraulic system according to claim 10, wherein the at least one hydraulic consumer includes a fire pump.

12. The hydraulic system according to claim 1, including a variable displacement pump connected to the power assembly, a constant displacement pump connected to the variable displacement pump, and at least one hydraulic user connected to the variable displacement pump or the constant displacement pump.

13. The hydraulic system according to claim 1, including a first variable displacement pump connected to the power assembly, a second variable displacement pump connected to the first variable displacement pump, and at least one hydraulic user connected to the first or second variable displacement pump.

14. The hydraulic system according to claim 12, wherein the hydraulic user is a fire pump.

15. The hydraulic system according to claim 13, wherein the second pump is a variable displacement pump and the hydraulic user is a fire pump.

16. A method of operating a fire pump, comprising the steps of:
    operatively connecting a first variable displacement pump to a power assembly connected to a vehicle drive line, the power assembly selected from the group consisting of a split shaft power take off assembly and a transfer case;
    operatively connecting a second variable displacement pump to the first variable displacement pump; and
    operatively connecting a fire pump to the first or second variable displacement pump.

* * * * *